United States Patent Office 2,959,753
Patented Nov. 8, 1960

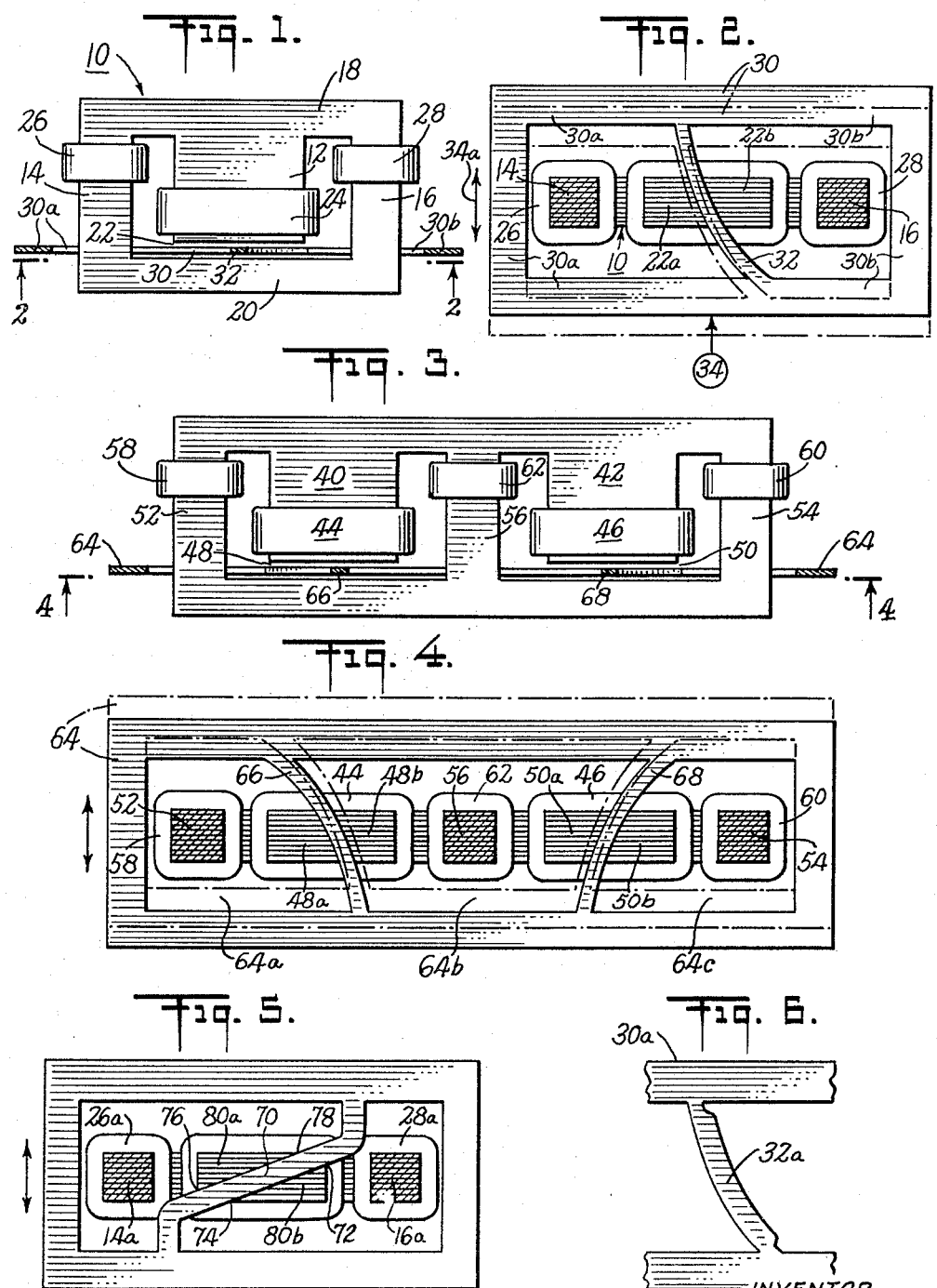

2,959,753

POSITION MEASURING APPARATUS

Graydon Smith, Concord, Mass., assignor, by mesne assignments, to Clevite Corporation Filed Aug. 20, 1957, Ser. No. 679,216

12 Claims. (Cl. 336—75)

This invention relates to transducing apparatus arranged to produce an electrical output signal the magnitude of which varies in accordance with changes in the positioning of a movable input member. More particularly, this invention relates to such apparatus wherein the electrical output signal varies non-linearly with respect to the input motion. Apparatus in accordance with this invention is especially adapted for operation with a primary condition-response device of the type which produces an output motion that is non-linearly related to changes in the condition being measured. By arranging the transducer in such a manner that its non-linear characteristic is inversely related to the non-linear characteristic of the condition-responsive device, the electrical output signal of the transducer will be linearly related to the magnitude of the condition being measured.

In the industrial instrumentation field, for example, there are a number of applications where it is desirable to use a primary condition-responsive or sensing device having a movable output element the positioning of which varies non-linearly with respect to changes in the condition being measured. A typical example is in the measurement of fluid flow, where it is common practice to use a differential-pressure sensing device adapted to produce an output motion in accordance with changes in the pressure drop across an orifice plate, or other similar element, inserted in the fluid stream. As is well known, the pressure drop in such an arrangement is proportional to the square of the fluid velocity; that is, when the fluid is flowing at a relatively rapid rate, the change in differential pressure for a given change in flow velocity will be greater than when the fluid is flowing at a slower rate. Because of this, the changes in positioning of the output element in a typical unit of this type are non-linearly related to the corresponding variations in fluid flow rate.

Such non-linear relationships have in the past posed severe problems in the design and manufacture of indicating and recording instruments. For example, if the output element of a differential-pressure flowmeter is connected directly to the pen arm of a conventional recorder, the scale markings on the recorder must be arranged in non-linear fashion to assure correspondence between actual flow rates and indicated flow rates. Such a scale, of course, does not provide uniform reading accuracy throughout, because the scale divisions are more compressed at one end than at the other. In addition, such a scale is not easy to read at a glance, so that careful attention must be given to correlating the pen mark position with the scale graduations.

To avoid these difficulties, some equipments provided heretofore have included special non-linear mechanical linkages between the primary sensing device and the recording instrument. Although such arrangements are operable in certain applications, the construction and calibration of the complex interconnecting linkages required involve considerable effort and expense.

It also is especially desirable in many instances to produce an electrical output signal that is directly related to the condition being measured by a non-linear sensing device. For example, an electrical output signal can easily be transmitted to a remote control system and used to control the operation of indicating or recording apparatus at that station. In addition, an electrical signal that is directly related to the condition being measured can be fed to a conventional integrating device such as a watt-hour meter or the equivalent, e.g. to produce an indication of total volumetric flow over a given period of time.

In a preferred embodiment of the present invention, the transducer comprises a magnetic core wound with a primary winding and a pair of secondary windings, with unique means for controlling the relative amounts of flux passing through the secondary windings.

A transducer of the general type with which the present invention is concerned is shown in U.S. Patent 2,697,214. In such apparatus as provided heretofore, a movably mounted "flux-barrier" controls the relative distribution of alternating magnetic flux between two magnetic circuit paths so as to develop in the secondary windings an output signal which varies linearly with respect to the flux-barrier position. Typically, the apparatus comprises a three-legged core formed of ferromagnetic material, with the central leg having an air-gap within which the flux-barrier is arranged to move.

Briefly, the operation of the present transducer is as follows: flux is produced by a primary winding surrounding the central leg, and secondary windings on the two outer legs develop signals in accordance with the amount of flux passing therethrough. The secondary windings are connected in series-opposition, so that, when the flux-barrier is positioned in the air-gap so as to produce an even division of flux between the two outer legs, the individual secondary voltages will cancel to produce a "null" or zero output. As the flux-barrier is moved away from this position, the flux passing through the secondary windings is correspondingly unbalanced with the result that the net output voltage produced by the secondary windings has a finite value related to the positioning of the flux-barrier. In accordance with a principal aspect of the present invention, it has been found that the flux-barrier can be constructed in such a manner (to be explained hereinbelow in more detail) that the transducer output voltage varies in a predetermined non-linear fashion with respect to the positioning of the barrier.

Accordingly, it is an object of the present invention to provide position measuring apparatus adapted to produce an electrical output signal which varies non-linearly with respect to the motion of an input member. It is a further object of this invention to provide such apparatus that is simple in design and inexpensive to manufacture. It is a still further object of this invention to provide such apparatus wherein the non-linear relationship can readily be set in accordance with any desired function. Other objects, advantages and aspects of the present invention will be in part pointed out in, and in part apparent from, the following description of a preferred embodiment of the invention, considered together with the accompanying drawings in which:

Figure 1 is an elevation view of apparatus constructed in accordance with the present invention, with the flux-barrier shown in section;

Figure 2 is a section taken along lines 2—2 of Figure 1, particularly showing the lay-out of the flux-barrier;

Figure 3 shows a further embodiment of the present invention;

Figure 4 is a section taken along line 4—4 of Figure 3;

Figure 5 represents a still further embodiment of the present invention; and

Figure 6 is a fragmentary showing of a modified flux-barrier for use in the embodiment of Figures 1 and 2.

Referring now to Figure 1, the apparatus shown there comprises a three-legged laminated core generally indicated at 10 and formed of ferromagnetic material. This core includes a central leg 12 and a pair of outer legs 14 and 16 joined by top and bottom portions 18 and 20. The central leg is interrupted at its lower end to form a rectangular air-gap 22 with the bottom portion 20.

Surrounding the central leg 12 is a primary winding 24 adapted to be energized by a source of alternating current, e.g. having a frequency of 60 cycles per second. When so energized, this winding produces alternating magnetic flux across the air-gap 22 and around the two flux paths formed by the outer legs 14 and 16. Surrounding the outer legs are respective secondary windings 26 and 28 which may be connected in series-opposition; the combined output of these windings is fed to an electrical measuring instrument (not shown) such as a voltmeter or recorder, or to process control equipment.

Positioned within the air-gap 22 is a flux-barrier 30 (see also Figure 2) which is an electrically-conductive element arranged generally in the form of a figure 8. This flux-barrier includes a curved cross-piece 32 which intersects the two long sides of the air-gap. The flux-barrier positioning is controlled by a source of motion diagrammatically indicated at 34 and which is adapted to move the barrier laterally, i.e. in a direction transversely with respect to the long sides of the air-gap as indicated by the arrow 34a. Conventional mounting means (not shown) are provided to support the flux-barrier so as to accommodate this motion.

The flux-barrier 30 may be considered as being formed of two separate electrically-conductive loops 30a and 30b with the curved cross-piece 32 common to both loops. The loop 30a surrounds the flux passing across the portion 22a of the air-gap to the left of the cross-piece and the flux passing through the left-hand outer leg 14, while the loop 30b surrounds the flux passing across the right-hand air-gap portion 22b and the flux passing through the right-hand outer leg 16. Because there cannot be any net flux passing through either of the loops 30a or 30b (due to the flux-barrier action described in the above-identified patent), the relative division of flux between the outer legs 14 and 16 is determined by the relative areas of the air-gap portions 22a and 22b.

When the flux-barrier 30 is positioned so that these air-gap portions 22a and 22b have equal areas (as shown in solid outline in Figure 2) the flux passing through the secondary windings 26 and 28 will be equal, and accordingly the transducer will produce zero output voltage. However, when the flux-barrier is shifted laterally (e.g. to the position shown in dotted outline), the air-gap portions 22a and 22b will have unequal areas, and accordingly the voltages induced in the secondary windings will be unequal in magnitude so as to produce a net output voltage.

Due to the curvature of the cross-piece 32, the change in relative areas of the air-gap portions 22a and 22b will be non-linearly related to the lateral change in positioning of the flux-barrier 30, and accordingly the output voltage produced by the transducer also will be non-linearly related to the positioning of the flux-barrier. It will be apparent that the cross-piece 32 may be arranged to have any predetermined curvature or configuration so that any desired relationship can be achieved in this manner.

It is, of course, important in the embodiment shown in Figure 1 that the flux-barrier 30 be mounted in such a way as to prevent any substantial longitudinal motion, i.e. movement perpendicular to the lateral motion produced by the source 34, since such longitudinal motion would change the relative areas of the air-gap portions 22a and 22b and thereby alter the output voltage. For applications where very high precision is required, the possibility of errors from this source can be eliminated by the arrangement shown in Figures 3 and 4.

This arrangement consists of a five-legged magnetic core having a pair of legs 40 and 42 provided with respective primary windings 44 and 46 energized from a source of alternating current (not shown). Flux produced by the primary windings passes across respective air-gaps 48 and 50 in these legs and circulates around the closed magnetic paths formed by a pair of outer legs 52 and 54 and an intermediate leg 56. These latter legs are provided with respective secondary windings 58, 60 and 62 connected in series and so arranged that the voltages induced in the outer secondaries 58 and 60 are in phase with each other but out of phase with the voltage induced in the center secondary winding 62.

A dual flux-barrier 64 is provided (see Figure 4) including a pair of curved cross-pieces 66 and 68 which extend across the air-gaps 48 and 50 and form three electrically-conductive loops 64a, 64b and 64c surrounding the legs 52, 54 and 56 respectively. With the flux-barrier positioned so that the combined areas of the air-gap portions 48a and 50b (to the left and right of the cross-pieces 66 and 68 respectively) is equal to the combined areas of the air-gap portions 48b and 50a (between the cross-pieces), there will be no net voltage produced in the output circuit by the three secondary windings. That is, in this condition the combined voltages induced in the secondary windings 58 and 60 by the flux from the primary windings 44 and 46 will be exactly equal and opposite in phase to the voltage induced in the secondary winding 62 by the primary winding flux. Thus, there will be a zero net voltage developed across the three secondaries in series.

When the flux-barrier 64 is moved so as to shift the cross-pieces 66 and 68 transversely with respect to the long sides of the air-gaps (e.g. to the position shown in dotted outline), the voltages induced in the left-hand and right-hand secondary windings 58 and 60 will be increased, while the voltage induced in the center secondary winding 62 will be decreased. Since the center secondary voltage is out of phase with the outer secondary voltages, this lateral movement of the flux-barrier will produce a net output voltage across all three secondary windings in accordance with the extent of movement. And, as explained in connection with the Figure 1 embodiment, the curvature of the cross-pieces 66 and 68 causes the variation in output voltage to be non-linearly related to the positioning of the flux-barrier. It may be noted, however, that the sensitivity of the Figure 3 embodiment will be double that of the Figure 1 embodiment, assuming of course that comparable core and winding constructions are used.

If the flux-barrier is shifted longitudinally, e.g. to the right in Figure 4, the voltage induced in the left-hand secondary 58 will be increased while the voltage in the right-hand secondary 60 will be decreased an equal amount. Since these two voltages are in phase with each other, however, there will be no resultant effect on the net output voltage across the secondaries. Furthermore, this longitudinal motion of the flux-barrier has no effect on the voltage induced in the center secondary winding 62, because the decrease in flux developed by the primary winding 44 in the leg 56 is exactly counterbalanced by a corresponding increase in flux developed by the other primary winding 46 in this leg. Accordingly, the output voltage produced by the Figure 3 embodiment is essentially independent of longitudinal flux-barrier movement, thereby considerably simplifying the problems of mounting the flux-barrier.

Figure 5 shows still another transducer construction adapted to provide an output voltage that varies non-linearly with respect to lateral movement of the flux-barrier. In this arrangement, the magnetic circuitry is identical to that shown in Figure 1, but the flux-barrier cross-piece 70 is a straight conductive element set at an angle with respect to the sides of the air-gap. One edge of this cross-piece intersects two adjacent sides of the air-gap as indicated at 72 and 74, while the other edge intersects the other two adjacent air-gap sides as indicated at 76 and 78. It will be apparent that when the flux-barrier is shifted laterally, the areas of the air-gap portions 80a and 80b will change so as to alter the relative voltages induced in the secondary windings 26a and 28a. Furthermore, the amount of area change is proportional to the square of the extent of flux-barrier movement because both the width and length of these areas vary as the barrier is shifted. Consequently, the net output voltage developed across the secondaries 26a and 28a will vary non-linearly with respect to lateral changes in positioning of the flux-barrier.

With regard generally to the embodiments described above, it is desirable to have the phase angle of the output signal remain constant with respect to the alternating current supply, regardless of the position of the flux-barrier. Constant phase angle requires that the total flux linking the secondary coils remain constant. Since conductive material, such as the cross-piece 32 (Figure 2), resists the penetration of alternating magnetic flux due to eddy-current action, then any change in the volume of such conductive material in the air-gap will change the total flux. This undesired effect can substantially be avoided, for example, by shaping the cross-piece so that its width (as measured in a direction parallel to the long side of the air-gap) is the same at all points along the length of the cross-piece. In this way, the total air-gap area represented by the separate air-gap portions on opposite sides of the cross-piece will effectively be invariant with changes in position of the flux-barrier.

In certain applications, the total flux passing through the secondary coils may be altered by structure outside of the air-gap. For example, referring to Figure 2, the outer rectangular frame of the flux-barrier 30 may be moved sufficiently close (i.e. at either end of the stroke) to the air-gap 22 to intercept part of the leakage flux around the gap and thereby change the total flux linking the secondaries. This effect, if it occurs to a noticeable extent in a particular transducer construction, can be compensated for by proper shaping of the cross-piece 32. Thus, as shown in Figure 6, the ends of the cross-piece 32a may be narrowed in width adjacent the outer sections of the flux-barrier 30a; when the flux-barrier reaches the ends of its stroke the amount of conductive material actually in the air-gap will be reduced so as to tend to compensate for the effect of the flux-barrier frame on the leakage flux around the air-gap.

Although several embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Measuring apparatus adapted to produce an electrical output signal the magnitude of which varies non-linearly with respect to the displacement of a movable member thereof, comprising, in combination, a structure of magnetic material having first and second magnetic circuits and a third magnetic circuit common to said first and second circuit, air-gap means for said structure arranged to couple said third circuit to said first and second circuits, primary winding means inductively coupled to said structure to induce magnetic flux in said circuits, secondary winding means coupled to said first and second circuits respectively, a movable flux-barrier comprising conductive means surrounding said first and second circuits for controlling the division of said flux between said circuits, said flux-barrier including at least one cross-piece positioned to extend into said air-gap means and to intersect two opposing sides thereof, and input motion means adapted to move said flux-barrier in a direction other than parallel to said opposing sides, said cross-piece being curved relative to an imaginary line parallel to said direction of movement whereby said movement alters said division of flux in accordance with a predetermined non-linear relationship.

2. Apparatus as claimed in claim 1, wherein said flux-barrier is arranged to form two conductive loops with said cross-piece common to each of said loops.

3. Apparatus as claimed in claim 2, wherein said structure comprises a three-legged core having two outer legs and a center leg, said center leg being interrupted to form said air-gap means, each of said conductive loops surrounding a corresponding one of said outer legs.

4. Measuring apparatus adapted to produce an electrical output signal the magnitude of which varies non-linearly with respect to the displacement of a movable member thereof comprising, in combination, magnetic material establishing first and second pairs of magnetic circuits and a third pair of magnetic circuits each common to one of said first and second pairs respectively, primary winding means inductively coupled to said third pair of magnetic circuits to induce magnetic flux in said material, first and second air-gap means arranged to couple each of said third circuits respectively to a corresponding pair of said first and second pairs of circuits, secondary winding means coupled to said first and second pairs of circuits respectively to develop an electrical output signal in accordance with the flux passing therethrough, a movable flux-barrier comprising electrically conductive means surrounding each of said first and second pairs of circuits respectively for controlling the division of said flux between the individual ones of said pairs of circuits, said flux-barrier including a pair of cross-pieces each positioned to extend into a corresponding one of said air-gap means and to intersect two opposing sides thereof, and input motion means adapted to move said flux-barrier in a direction transverse to said opposing sides, said cross-pieces being curved relative to an imaginary line parallel to said direction of movement whereby said movement alters said division of flux in accordance with a predetermined non-linear relationship, said cross-pieces being curved oppositely to minimize variations in output voltage resulting from movement of said flux-barrier in a direction parallel to said opposing sides of said air-gap means.

5. Apparatus as claimed in claim 4, wherein said magnetic material forms a five-legged structure, the first, third and fifth legs thereof carrying said secondary windings, and the second and fourth legs thereof carrying said primary windings.

6. Apparatus as claimed in claim 5, wherein said flux-barrier comprises a generally planar element establishing first, second and third conductive loops, one of said cross-pieces being common to said first and second loops, the other of said cross-pieces being common to said second and third loops, said cross-pieces curving in opposite directions.

7. Apparatus as claimed in claim 6, wherein said flux-barrier comprises two side strips joined by two end strips, both of said cross-pieces connecting said side strips in regions thereof between said ends strips.

8. Measuring apparatus adapted to produce an electrical output signal the magnitude of which varies non-linearly with respect to the displacement of a movable member thereof, comprising, in combination, a three-legged core of magnetic material having a pair of outer legs establishing first and second magnetic circuits and a center leg establishing a third magnetic circuit common to said first and second circuits, said center leg being interrupted to form an air-gap arranged to couple said third circuit to said first and second circuits, a primary winding wound around said center leg to produce magnetic flux in said structure, first and second secondary windings coupled to said first and second circuits respectively, a movable flux-barrier comprising two conductive loops each surrounding a respective one of said outer legs for controlling the division of said flux between said first and second circuits, said flux-barrier including a cross-piece common to both of said loops and positioned to extend into said air-gap with one edge of said cross-piece intersecting two adjacent sides of said air-gap, whereby to establish two air-gap portions each surrounded by one of said loops, and input motion means adapted to move said flux-barrier in a direction transversely with respect to one of said adjacent sides so that the areas of said surrounded air-gap portions change in a non-linear fashion with corresponding changes in the positioning of said flux-barrier produced by said input motion means.

9. Apparatus as claimed in claim 8, wherein said cross-piece is a straight strip of conductive material one edge of which intersects two adjacent sides of said air-gap and the other edge of which intersects the remaining two sides of said air-gap, said center leg being rectangular in cross section.

10. Apparatus as claimed in claim 1, wherein the width of said cross-piece is constant at all points along the length thereof to maintain the volume of conductive material in the air-gap flux constant with changes in positioning of the flux-barrier.

11. Apparatus as claimed in claim 1, wherein said cross-piece is narrowed in at least one portion thereof to compensate for changes in flux due to the presence of conductive material movable with said flux-barrier and external to said air-gap.

12. Apparatus as claimed in claim 11, wherein the width of said cross-piece is less at the ends than in the central region thereof.

References Cited in the file of this patent

UNITED STATES PATENTS

| | | |
|---|---|---|
| 2,631,272 | Smith | Mar. 10, 1953 |
| 2,774,057 | Jones | Dec. 11, 1956 |